(12) United States Patent
Vicars

(10) Patent No.: US 8,584,700 B2
(45) Date of Patent: Nov. 19, 2013

(54) DISCHARGE VALVE

(75) Inventor: Berton L. Vicars, Ruidoso, NM (US)

(73) Assignee: J-Mac Tool, Inc., Fort Worth, TX (US)

( * ) Notice: Subject to any disclaimer, the term of this patent is extended or adjusted under 35 U.S.C. 154(b) by 0 days.

(21) Appl. No.: 13/066,818

(22) Filed: Apr. 26, 2011

(65) Prior Publication Data

US 2013/0075643 A1   Mar. 28, 2013

Related U.S. Application Data

(63) Continuation of application No. 12/453,452, filed on May 12, 2009, now abandoned.

(51) Int. Cl.
*F16K 15/06* (2006.01)
*F16K 21/10* (2006.01)

(52) U.S. Cl.
USPC ............... 137/543.15; 137/514.3; 137/516.29

(58) Field of Classification Search
USPC ................ 137/454.6, 514.3, 516.25, 516.29, 137/543.15
See application file for complete search history.

(56) References Cited

U.S. PATENT DOCUMENTS

| | | | | |
|---|---|---|---|---|
| 843,988 A * | 2/1907 | Barton | ........................ | 137/514.3 |
| 1,400,011 A * | 12/1921 | Baker | ........................ | 137/514.3 |
| 1,428,981 A * | 9/1922 | Redfield | ................... | 137/543.15 |
| 1,561,175 A * | 11/1925 | Labus | ........................ | 137/543.15 |
| 2,212,600 A * | 8/1940 | Harm | ........................ | 137/543.15 |
| 3,202,178 A * | 8/1965 | Wolfe | ........................ | 137/516.29 |
| 4,489,752 A * | 12/1984 | Deminski | ................ | 137/543.15 |
| 5,931,191 A * | 8/1999 | Taube et al. | ................ | 137/514.3 |
| 6,698,450 B2 * | 3/2004 | Vicars | ....................... | 137/516.29 |
| 7,004,195 B2 * | 2/2006 | Vicars | ....................... | 137/516.29 |
| 2003/0235508 A1 * | 12/2003 | Vicars | ............................ | 417/571 |

* cited by examiner

*Primary Examiner* — John Rivell
(74) *Attorney, Agent, or Firm* — James E. Walton; J. Oliver Williams

(57) ABSTRACT

A discharge valve including a tubular, valve seat and a valve guide disposed above the valve seat. The valve guide has a discharge passage plug and a guide rod that is affixed to, and projects downwardly from, the bottom of the plug. The valve guide also has an interiorly threaded, lifting sleeve that is affixed to, and projects upwardly from, the top of the plug. A piston is disposed between the valve seat and the valve guide. The piston has a conical, head portion for engaging the top of the valve seat, and a stem portion that is affixed to, and extends upwardly from, the head portion. The stem portion has a longitudinal socket within which the guide rod is slidably received. The stem portion also has a number of apertures that intersect the socket for providing pressure relief to the socket. A compressed spring is disposed between the valve guide and the head portion of the piston for normally retaining the head portion in engagement with the valve seat. An externally threaded, valve retainer is disposed above the valve guide for pressing the valve guide toward the valve seat.

6 Claims, 2 Drawing Sheets

US 8,584,700 B2

DISCHARGE VALVE

CONTINUING APPLICATION DATA

This application is a continuation of U.S. patent application Ser. No. 12/453,452, filed on May 12, 2009, now abandoned.

FIELD OF THE INVENTION

The present invention relates generally to fluid handling apparatus and, more particularly, to direct response valves of reciprocating type.

BACKGROUND OF THE INVENTION

Hydraulic fracturing can increase the rate of production of oil and gas from low-permeability reservoirs. Hydraulic fracturing increases the permeability of reservoir rocks by opening channels through which oil and gas can travel to recovery wells. During hydraulic fracturing, a fluid is pumped through a wellbore under high pressure into a subterranean reservoir where it splits or fractures the reservoir rock. A proppant, like sand, is often added to the pumped fluid and carried in suspension into the newly formed fractures. When pumping ceases, the fractures partially close on the proppant, leaving open channels for oil and gas to flow to the recovery well, i.e., the wellbore through which the fracture fluid was originally pumped.

High-pressure pumps are used to complete hydraulic fracturing procedures or "frac jobs." These pumps have "fluid ends" within which a number of reciprocating plungers pressurize a fracture fluid. Suction and discharge valves control fluid flow to, and from, the plungers. A valve that has too many internal projections can capture or "knock out" enough proppant to block the flow of fluid through a pump, requiring that time and effort be invested to clear the blockage and repair any damage to the pump—a costly undertaking. Also, tortuous flow pathways through valves can create substantial pressure losses that require more energy to be expended by a pump than is necessary to perform hydraulic fracturing work.

Commonly used discharge valves possess a number of guides or "wings" that project into the center of a valve to hold a piston in place. These wings are known to capture proppants suspended in fracture fluids. A need exists for an improved, discharge valve without wings.

SUMMARY OF THE INVENTION

In light of the problems associated with the valves used in pumps for hydraulic fracturing, it is a principal object of the invention to provide a discharge valve that reduces the likelihood of proppant blockages. My discharge valve offers few impediments to fluid flow so that fracturing fluids can flow through it with minimum turbulence. As a result, fracturing fluids with higher than normal concentrations of suspended proppants can be pumped.

It is an additional object of the invention to provide a discharge valve of compact size that can be positioned close to a corresponding suction valve thereby permitting faster transit times for a fracture fluid through a pumping chamber and greater pumping efficiencies.

It is another object of the invention to provide a discharge valve that can be seated in a shallow pocket in a fluid end of a pump. A shallow pocket requires that less load-bearing material be removed from the fluid end at the time of its manufacture thereby increasing the strength and durability of a fluid end. It is less likely, then, that a fluid end configured to receive my discharge valve will fail from the development of stress cracks.

It is a further object of the invention to provide a discharge valve of the type described that features a "male" valve guide upon which a piston rides. The valve guide carries the piston to a valve seat so as to close the discharge valve with great precision and minimal wobble that, if present, could induce vibrations in the pump within which the discharge valve is mounted.

Still another object of the invention is to provide a discharge valve that features a ported piston that permits the piston to slide freely on the valve guide and reduces the likelihood that the discharge valve will become stuck "open" or "closed" so as to permit valve leakage.

It is an object of the invention to provide improved features and arrangements thereof in a discharge valve for the purposes described which is lightweight in construction, inexpensive to manufacture, and fully dependable in use.

Briefly, my discharge valve achieves the intended objects by featuring a valve seat and a valve guide disposed above the valve seat. The valve guide has a discharge passage plug and a guide rod that is affixed to, and projects downwardly from, the bottom of the plug. The valve guide also has an interiorly threaded, lifting sleeve that is affixed to, and projects upwardly from, the top of the plug. A piston is disposed between the valve seat and the valve guide. The piston has a head portion for engaging the top of the valve seat, and a stem portion that is affixed to, and extends upwardly from, the head portion. The stem portion has a longitudinal socket within which the guide rod is slidably received. The stem portion also has a number of apertures that intersect the socket for providing pressure relief to the socket. A compressed spring is disposed between the valve guide and the head portion of the piston for normally retaining the head portion in engagement with the valve seat. An externally threaded, valve retainer is disposed above the valve guide for pressing the valve guide toward the valve seat.

The foregoing and other objects, features, and advantages of my discharge valve will become readily apparent upon further review of the following detailed description of my discharge valve which is illustrated in the accompanying drawings.

BRIEF DESCRIPTION OF THE DRAWINGS

My discharge valve may be more readily described with reference to the accompanying drawings, in which.

Similar reference characters denote corresponding features consistently throughout the accompanying drawings.

DETAILED DESCRIPTION OF THE DISCHARGE VALVE

Figure 1:
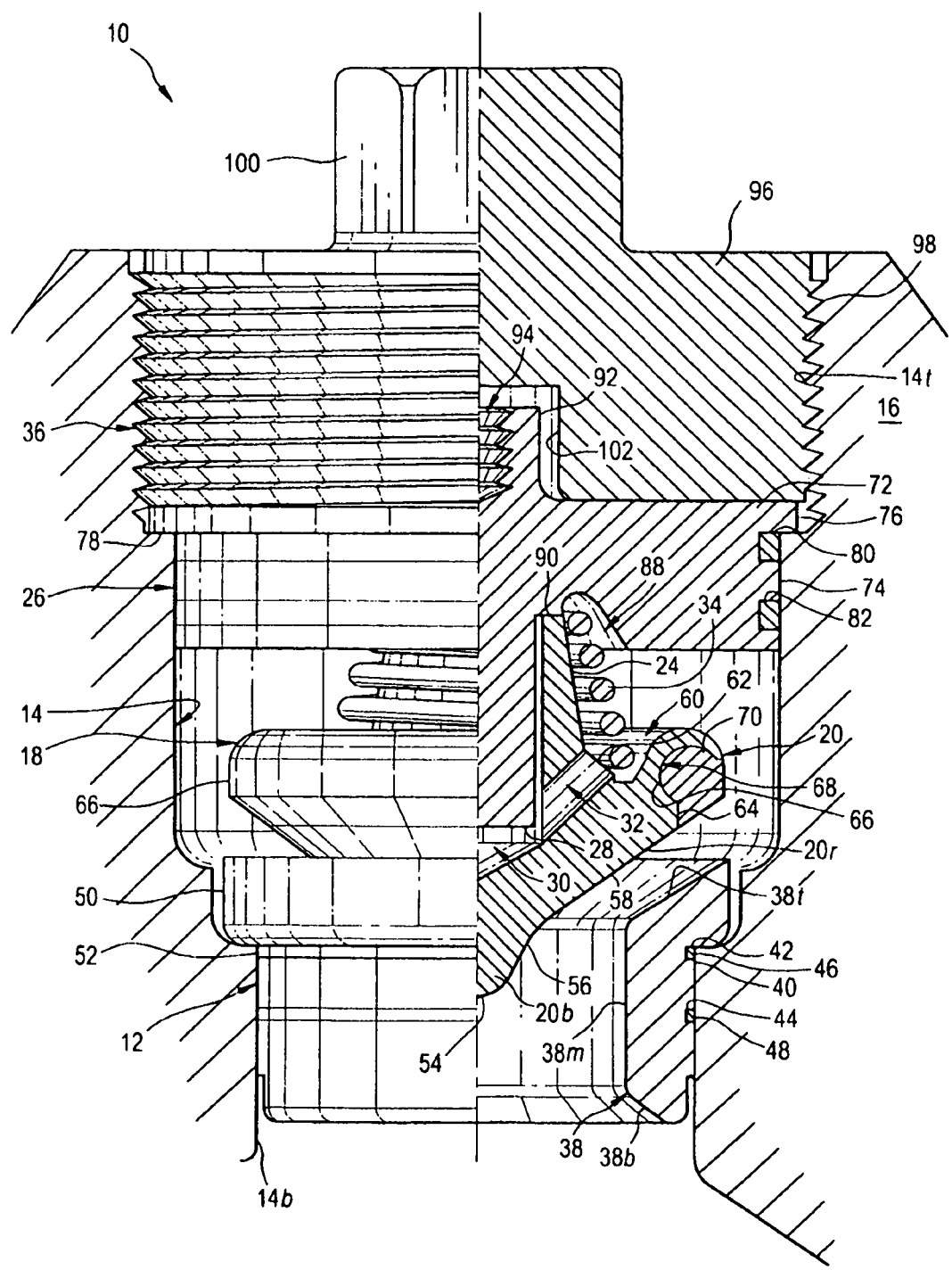
FIG. 1 is a side elevational view of my discharge valve with portions broken away to reveal details thereof.
Figure 2:
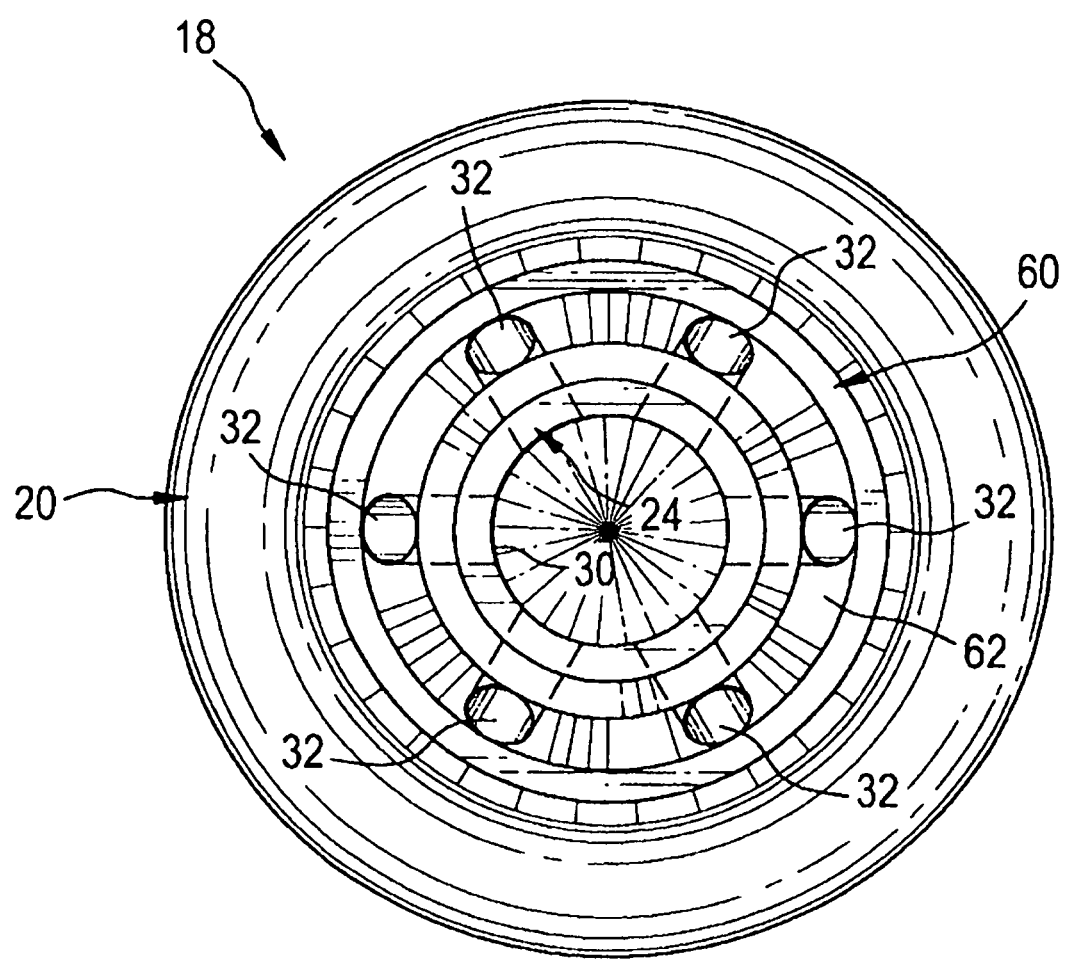
FIG. 2 is a top view of the piston of the discharge valve of FIG. 1.

Referring now to the FIGS., a discharge valve in accordance with the present invention is shown at 10. Valve 10 includes a valve seat 12 for positioning in the bottom of a discharge passage 14 of a fluid end 16 and a reciprocating piston 18 for controlling the flow of fluid through passage 14. Piston 18 has a head portion 20 for engaging valve seat 12 and a hollow, stem portion 24 extending upwardly from head portion 20. A valve guide 26 is positioned above piston 18 in passage 14 and has a guide rod 28 that projects downwardly into a longitudinal socket 30 provided in stem portion 24 where it is slidably received. A number of radial apertures 32 penetrate the bottom of stem portion 24 equalize pressures between passage 14 and socket 30. A compressed spring 34 is disposed between the valve guide 26 and head portion 20 to normally press head portion 20 into engagement with seat 12. A valve retainer 36 is screwed into the top of passage 14 to retain valve 10 within fluid end 16.

Valve seat 12 is a hollow cylinder with an inner wall 38 that is shaped to minimize turbulent flow. Wall 38 has a top part 38*t* that slopes downwardly and inwardly toward the center of seat 12 at an angle of about 36°. Wall 38 also has a bottom part 38*b* that slopes upwardly and inwardly at an incline that is substantially equal to that of top part 38*t*. Finally, wall 38 has a substantially vertical, middle part 38*m* that connects the bottom of top part 38*t* to the top of bottom part 38*b*.

Valve seat 12 has an outer wall 40 that snugly engages the sides of passage 14. Outer wall 40 slopes downwardly an inwardly at a shallow angle corresponding in slope with a taper provided in the bottom of passage 14. A pair of peripheral channels 42, 44 is provided around the middle of wall 40. Within each of channels 42, 44 is positioned an o-ring seal 46, 48 to inhibit leaks around seat 12. Sloping wall 40, as described, prolongs the life of seals 46, 48 and reduces the likelihood of fatigue cracks forming in fluid end 16.

Projecting from the top of outer wall 40 is a peripheral flange 50. The bottom of flange 50 slopes downwardly and inwardly toward outer wall 40 at an angle of about 30°. This 30° angle corresponds with that of a seat deck 52 formed at the junction of the small-diameter, bottom portion 14*b* of passage 14 and the medium-diameter, middle portion 14*m* of passage 14. A sloping seat deck 52, as described, has been found to provide a strong platform for seat 12 that minimizes induced stresses in fluid end 16.

Head portion 20 includes a bottom part 20*b* and a rim part 20*r* that extends upwardly and outwardly from the periphery of bottom part 20*b*. Bottom part 20*b* is conical with a rounded bottom wall 54 and a side wall 56 that extends upwardly and outwardly from bottom wall 54 at a slope of about 60°. Rim part 20*r*, however, has a side wall 58 that projects upwardly and outwardly from the top of side wall 58 at an angle of about 36° so as to permit flush positioning of rim part 20*r* against top part 38*t* of seat 12. In use, bottom part 20*b* projects sharply into the flow of fluid passing through seat 12 to initiate a radial deflection of the fluid around piston 18 that keeps piston 18 centered on guide rod 28. Centering piston 18 keeps piston 18 from sticking on guide rod 28 and ensures that rim part 20*r* seats perfectly against seat 12, inhibiting leaks.

Rim part 20*r* projects above bottom part 20*b* so as to define a circular recess 60 in the top of head portion 20. Recess 60 reduces the weight of piston 18 so that piston 18 can reciprocate more rapidly than it could without it. Recess 60 further serves as an abutment for the bottom of spring 34.

Stem portion 24 extends upwardly from the center of recess 60 within spring 34. Stem portion 24 is integrally formed with head portion 20 and has an exterior diameter that decreases gradually from its bottom within recess 60 to its top positioned above rim part 20*r*. The top of stem portion 24 abuts valve guide 26 to define the upper limit of travel of piston 18. Socket 30 extends downwardly through the center of stem portion 24 and into the center of rim part 20*r*. The bottom of stem portion 24 has a peripheral, downwardly and outwardly sloping ledge 62 that provides a surface through which apertures 32 can penetrate to enter the inner/bottom end of socket 30 and acts to deflect the bottom of spring 34 away from apertures 32 that might otherwise block apertures 32. Piston 18 has apertures 32 that extend outwardly from socket 30 at intervals of 60°. If one or several apertures 32 become blocked, the remainder serve as backups to balance the pressure within socket 30 with that in passage 14.

Side wall 58 of rim part 20*r* is provided with a peripheral recess 64 that snugly receives an insert 66, formed of a durable material, serving as a principal, sealing element for valve 10. Recess 64 has a back edge 68, remote from side wall 58, that is circular in cross section. Insert 66 has a back edge 70 that is corresponding in shape to that of back edge 68 so as to "snap fit" into recess 64. At the time of manufacture, back edge 70 is easy to press into head portion 20 and has little tendency to loosen over time.

Valve guide 26 includes a circular plug 72 having a circular, vertical, side wall 74 and a circumferential flange 76 projecting outwardly from the top of side wall 74. Flange 76 engages a seat deck 78 in fluid end 16 at the junction of the medium-diameter, middle portion 14*m* of passage 14 and the large-diameter, helically threaded, top portion 14*l* of passage 14. Since guide 26 transmits smaller loads to fluid end 16 than valve seat 12, it is not necessary that seat deck 78 be sloped like seat deck 52. To prevent fluid leaks around plug 72, side wall 74 is provided with a pair of peripheral grooves 80, 82 beneath flange 76 within which are positioned o-ring seals 84, 86 for engaging fluid end 16.

Plug 72 has a circular recess 88 in the bottom thereof. Recess 88 is centered on the longitudinal axis of valve 10. A circular platform 90 extends downwardly from the center of recess partially toward the bottom of plug 72. Platform 90 serves as an abutment for the top of stem portion 24 of piston 18. The annular area in recess 88, formed around platform 90, acts an abutment for the top of spring 34.

A cylindrical, guide rod 28 is integrally formed with plug 72. Guide rod 28 is smaller in diameter than platform 90 and extends downwardly from the center of platform 90 so as to be slidably received within socket 30 of stem portion 24. Guide rod 28 is long enough to retain stem portion 24 over the full range of travel of piston 18 yet is sufficiently short as to avoid contacting the bottom of socket 30 which could cause damage to both guide rod 28 and piston 18.

Projecting from the top of plug 72 is a cylindrical sleeve 92 with an interiorly threaded socket 94. Sleeve 92 is used in a conventional manner to lift valve guide 26 from passage 14 when it is desired to service valve 10.

Valve retainer 36 includes a circular cap 96 having a helically threaded side wall 98 that permits retainer 36 to be screwed into top portion 14*l* of passage 14. To facilitate the turning of retainer 36, a polygonal pin 100 of hexagonal cross section is affixed to, and extends upwardly from, the top of cap 96. Pin 100 is dimensioned so as to be easily grasped by a wrench. A cylindrical cutout 102 is provided in the bottom of cap 96 to loosely receive sleeve 92 projecting upwardly from the center of plug 72. When screwed fully into passage 14, the bottom of cap 96 presses downwardly upon the top of plug 72 so as to hold flange 76 tightly against seat deck 78.

After installing discharge valve 10 in passage 14, a plunger (not shown) is reciprocated in a pumping chamber beneath valve seat 12. As the plunger moves forward to drive pressurized fluid through seat 12, the compressive force of spring 34 is overcome and piston 18 is elevated to the position shown in FIG. 1. With head portion 20 being disengaged from seat 12, fluid flows past seat 12, bottom part 20*b* serving to guide piston 18 to a central location in the flow stream, and into middle portion 14*m* of passage 14. A discharge port (not shown) in fluid end 16 conveys pressurized fluid from middle portion 14*m* and from fluid end 16. When the plunger travels back to its starting point, the fluid pressure is reduced within seat 12 such that the compressive force of spring 34 drives side wall 58 and insert 66 of piston 18 onto top part 38*t* of seat 12 thereby preventing substantial volumes of fluid in middle portion 14*m* to travel back into seat 12 or the pumping chamber of fluid end 16.

The process of opening and closing discharge valve 10 is entirely automatic and can be accomplished many times in a second. Since the valve 10 minimizes turbulent flow, proppant is not "knocked out" by valve 10 so as to block the flow of fracture fluid through passage 14. Fluids containing greater proppant loads than normal can be pumped through valve 10 providing great cost savings to a user.

While discharge valve 10 has been described with a high degree of particularity, it will be appreciated by those skilled in the art that modifications can be made to it. Therefore, it is to be understood that my invention is not limited solely to valve 10, but encompasses any and all valve embodiments within the scope of the following claims.

I claim:

1. A discharge valve, comprising:
    a tubular, valve seat;
    a unitary valve guide being disposed above said valve seat, said valve guide including:
        a discharge passage plug, said plug being provided with a first circular recess in the bottom thereof;
        a guide rod being affixed to the bottom of said plug, said guide rod projecting downwardly from the center of said first circular recess; and,
        an interiorly threaded, lifting sleeve being affixed to, and projecting upwardly from, the top of said plug;
    a unitary piston being disposed between said valve seat and said valve guide, said piston including:
        a conical, head portion for engaging the top of said valve seat, said head portion being provided with a second circular recess in the top thereof; and,
        a stem portion being integrally affixed to said head portion, said stem portion projecting upwardly from the center of said second circular recess, said stem portion having a longitudinal socket within which said guide rod is slidably received, and said stem portion having a plurality of apertures therein, said apertures extending from said second circular recess to said socket;
    a compressed spring being disposed between said plug and said head portion for normally retaining said head portion in engagement with said valve seat, the top of said spring being disposed in said first circular recess and the bottom of said spring being disposed in said second circular recess, the spring being disposed around the apertures in the second circular recess of the stem portion; and,
    an externally threaded, valve retainer being disposed above said valve guide for pressing said valve guide toward said valve seat;
    wherein the stem portion has an outwardly sloping ledge to deflect the compressed spring away from the apertures adjacent the second circular recess.

2. The discharge valve according to claim 1 wherein said head portion of said piston includes:
    a conical, bottom part having a rounded bottom wall and a first side wall extending upwardly and outwardly from said bottom wall; and,
    a rim part being affixed to said bottom part, said rim part having a second side wall extending upwardly and outwardly from said bottom part at a shallower angle than said first side wall.

3. The discharge valve according to claim 1 wherein said seat includes a plurality of spaced-apart, peripheral channels in the outer surface thereof and further includes a plurality of O-ring seals, a respective one of which is positioned in each of said peripheral channels.

4. The discharge valve according to claim 1 wherein said head portion of said piston has a peripheral recess and said discharge valve further comprises an insert with a back edge that is circular in cross section being snugly positioned within said peripheral recess for engaging said seat.

5. The discharge valve according to claim 1 wherein said apertures in said stem portion slope downwardly to intersect the bottom of said longitudinal socket.

6. The discharge valve according to claim 5 wherein said valve retainer includes a cutout in the bottom thereof for receiving therein said sleeve of said valve guide.

* * * * *